United States Patent
Ahamed et al.

(10) Patent No.: US 11,568,649 B2
(45) Date of Patent: Jan. 31, 2023

(54) LANDMARK-LESS SIMULTANEOUS LOCALIZATION AND MAPPING

(71) Applicant: Continental Automotive Systems, Inc., Auburn Hills, MI (US)

(72) Inventors: Nizar Ahamed, Farmington Hills, MI (US); James H. Critchley, Lake Orion, MI (US); Sina Gholamnejad Davani, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/150,017

(22) Filed: Jan. 15, 2021

(65) Prior Publication Data

US 2022/0230016 A1 Jul. 21, 2022

(51) Int. Cl.
*G06V 20/56* (2022.01)
*G06K 9/00* (2022.01)
*G06K 9/62* (2022.01)
*G06V 20/64* (2022.01)

(52) U.S. Cl.
CPC .......... *G06V 20/56* (2022.01); *G06K 9/0057* (2013.01); *G06K 9/623* (2013.01); *G06V 20/653* (2022.01)

(58) Field of Classification Search
CPC .... G06V 20/56; G06V 20/653; G06K 9/0057; G06K 9/623; G05D 1/0231; G05D 1/0234; G05D 1/0246; G05D 1/0272; G05D 1/0274; G01C 21/12; G06T 7/0044; G06T 7/0065
USPC ............ 340/995.1, 988; 318/568.12, 568.16; 700/245, 253; 701/23; 901/1
See application file for complete search history.

(56) References Cited

U.S. PATENT DOCUMENTS

| | | | |
|---|---|---|---|
| 7,015,831 B2* | 3/2006 | Karlsson | G05D 1/0246 340/988 |
| 8,830,091 B2* | 9/2014 | Karlsson | G06T 7/55 340/988 |
| 8,855,819 B2 | 10/2014 | Choi et al. | |
| 9,110,470 B2* | 8/2015 | Karlsson | G01C 21/206 |

(Continued)

FOREIGN PATENT DOCUMENTS

| | | |
|---|---|---|
| CN | 106840179 B | 6/2017 |
| CN | 107990899 A | 5/2018 |

(Continued)

OTHER PUBLICATIONS

The International Search Report and the Written Opinion of the International Searching Authority dated May 19, 2022 for the counterpart PCT Application No. PCT/US2022/070205.

*Primary Examiner* — Adnan Aziz

(57) ABSTRACT

A simultaneous localization and mapping system for a motor vehicle is disclosed and includes a plurality of sensors disposed within a vehicle operable to detect an object proximate the vehicle and generate a plurality of data points representing sensor returns corresponding to the detected objects surrounding the vehicle, and a controller configured to receive the data points representing the sensor returns of the detected objects surrounding the vehicle, to define an occupancy grid based on the data points and to generate vehicle operating instructions based on the defined occupancy grid, wherein the controller is configured to define at least one geometric anchor from the detected data points and localizing the vehicle based on the at least one geometric anchor.

15 Claims, 3 Drawing Sheets

(56) References Cited

U.S. PATENT DOCUMENTS

| | | | |
|---|---|---|---|
| 9,329,598 B2 | 5/2016 | Pack et al. | |
| 10,222,211 B2 * | 3/2019 | Chen | G06T 7/70 |
| 10,571,280 B2 * | 2/2020 | Pratt | G01S 7/412 |
| 10,606,274 B2 * | 3/2020 | Yalla | G06K 9/6215 |
| 11,138,465 B2 * | 10/2021 | Ozog | G06F 17/11 |
| 11,281,228 B2 * | 3/2022 | Merfels | G01C 21/005 |
| 11,391,578 B2 * | 7/2022 | Zeng | G01C 21/32 |
| 2016/0139255 A1 | 5/2016 | Bueschenfeld et al. | |
| 2017/0176998 A1 | 6/2017 | Fechner et al. | |
| 2018/0299275 A1 | 10/2018 | Fong et al. | |
| 2019/0113927 A1 | 4/2019 | Englard et al. | |
| 2019/0171224 A1 | 6/2019 | Meysel et al. | |
| 2019/0384318 A1 | 12/2019 | Fuchs et al. | |
| 2020/0109954 A1 | 4/2020 | Li et al. | |
| 2020/0284587 A1 * | 9/2020 | Hare | G06F 16/29 |
| 2020/0380270 A1 | 12/2020 | Cox et al. | |
| 2021/0201569 A1 * | 7/2021 | Marschner | G06F 16/54 |
| 2021/0284198 A1 * | 9/2021 | Schmidt | B60W 30/143 |
| 2021/0404814 A1 * | 12/2021 | Hess | G06T 7/75 |

FOREIGN PATENT DOCUMENTS

| | | |
|---|---|---|
| CN | 109917376 A | 6/2019 |
| WO | 2019018315 A1 | 1/2019 |
| WO | 2020168667 A1 | 8/2020 |

\* cited by examiner

LANDMARK-LESS SIMULTANEOUS LOCALIZATION AND MAPPING

TECHNICAL FIELD

The present disclosure relates to driver assist and autonomous vehicle systems, and more specifically to a system and method of locating a vehicle relative to objects proximate a vehicle.

BACKGROUND

Vehicles may be equipped with a driver assist and/or autonomous vehicle operation system to operate a vehicle partially and/or fully independent of a vehicle operator.

In automated driving scenarios, it is important to know where the vehicle is exactly located on a map (a process known as localization) and simultaneously where things are in the world around the vehicle (a process known as mapping). Localization is often achieved using landmarks however situations arise when a landmark is not available or cannot be classified by the sensor data.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A simultaneous localization and mapping system for a motor vehicle according to one example disclosed embodiment includes, among other possible things, a plurality of sensors disposed within a vehicle operable to detect an object proximate the vehicle and generate a plurality of data points representing sensor returns corresponding to the detected objects surrounding the vehicle, and a controller configured to receive the data points representing the sensor returns of the detected objects surrounding the vehicle, to define an occupancy grid based on the data points and to generate vehicle operating instructions based on the defined occupancy grid, wherein the controller is configured to define at least one geometric anchor from the detected data points and localizing the vehicle based on the at least one geometric anchor.

In another embodiment of the foregoing simultaneous localization and mapping system, the controller is configured to locate the vehicle relative to the at least one geometric anchor.

In another embodiment of any of the foregoing simultaneous localization and mapping systems, the plurality of data points representing sensor returns comprise an initial set of data points and additional sets of data points and the controller is further configured to correlate each of the additional sets of data points to the at least one geometric anchor.

In another embodiment of any of the foregoing simultaneous localization and mapping systems, the controller is further configured to estimate a position of the vehicle based on the correlation between additional sets of data points and the at least one geometric anchor.

In another embodiment of any of the foregoing simultaneous localization and mapping systems, the controller is further configured for correcting an odometry model of the vehicle based on the estimated position of the vehicle provided by the correlation between the additional sets of data points and the at lease one geometric anchor.

In another embodiment of any of the foregoing simultaneous localization and mapping systems, the controller is further configured to redefine the at least one geometric anchor in response to at least one of a redefined distance of vehicle travel or a predefined number of additional sets of data points.

In another embodiment of any of the foregoing simultaneous localization and mapping systems, the at least one geometric anchor comprises two or more geometric anchors that define boundaries of a path of the vehicle.

In another embodiment of any of the foregoing simultaneous localization and mapping systems, the at least one geometric anchor comprises a set of data points on the generated occupancy grid arranged in a straight line.

In another embodiment of any of the foregoing simultaneous localization and mapping systems, the at least one geometric anchor comprises a set of data points on the generated occupancy grid arranged in a rectilinear shape or a curvilinear shape.

In another embodiment of any of the foregoing simultaneous localization and mapping systems, the plurality of sensors comprises at least one of a radar device, a lidar device and a camera.

A simultaneous localization and mapping method for a vehicle according to another disclosed example embodiment includes, among other possible things, detecting objects proximate to a vehicle with a plurality of sensors and generating a plurality of data points representing sensor returns corresponding to the detected objects surrounding the vehicle, and generating an occupancy grid based on the data points representing sensor returns with a processing device disposed within the vehicle and defining at least one geometric anchor from the detected data points and localizing the vehicle relative to the at least one geometric anchor.

Another embodiment of the foregoing method of simultaneous localization and mapping further includes generating a plurality of data points representing data points comprises generating an initial set of data points and additional sets of data points and generating the occupancy grid further comprises correlating each of the additional sets of data points with the at least one geometric anchor.

Another embodiment of any of the foregoing methods of simultaneous localization and mapping further comprises estimating a position of the vehicle based on the correlation between additional sets of data points and the at least one geometric anchor.

Another embodiment of any of the foregoing methods of simultaneous localization and mapping further comprises correcting an odometry model of the vehicle based on the estimated position of the vehicle provided by the correlation between the additional sets of data points and the at lease one geometric anchor.

Another embodiment of any of the foregoing methods of simultaneous localization and mapping further comprises redefining the at least one geometric anchor in response to a redefined distance of vehicle travel.

Another embodiment of any of the foregoing methods of simultaneous localization and mapping further comprises redefining the at least one geometric anchor in response to obtaining a predefined number of additional sets of data points.

In another embodiment of any of the foregoing methods of simultaneous localization and mapping, the at least one geometric anchor comprises two or more geometric anchors that define boundaries of a path of the vehicle.

In another embodiment of any of the foregoing methods of simultaneous localization and mapping, the at least one geometric anchor comprises a set of data points on the generated occupancy grid arranged in a straight line.

In another embodiment of any of the foregoing methods of simultaneous localization and mapping, the at least one geometric anchor comprises a set of data points on the generated occupancy grid arranged in a rectilinear shape.

In another embodiment of any of the foregoing methods of simultaneous localization and mapping, the at least one geometric anchor comprises a set of data points arranged in a curvilinear shape.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
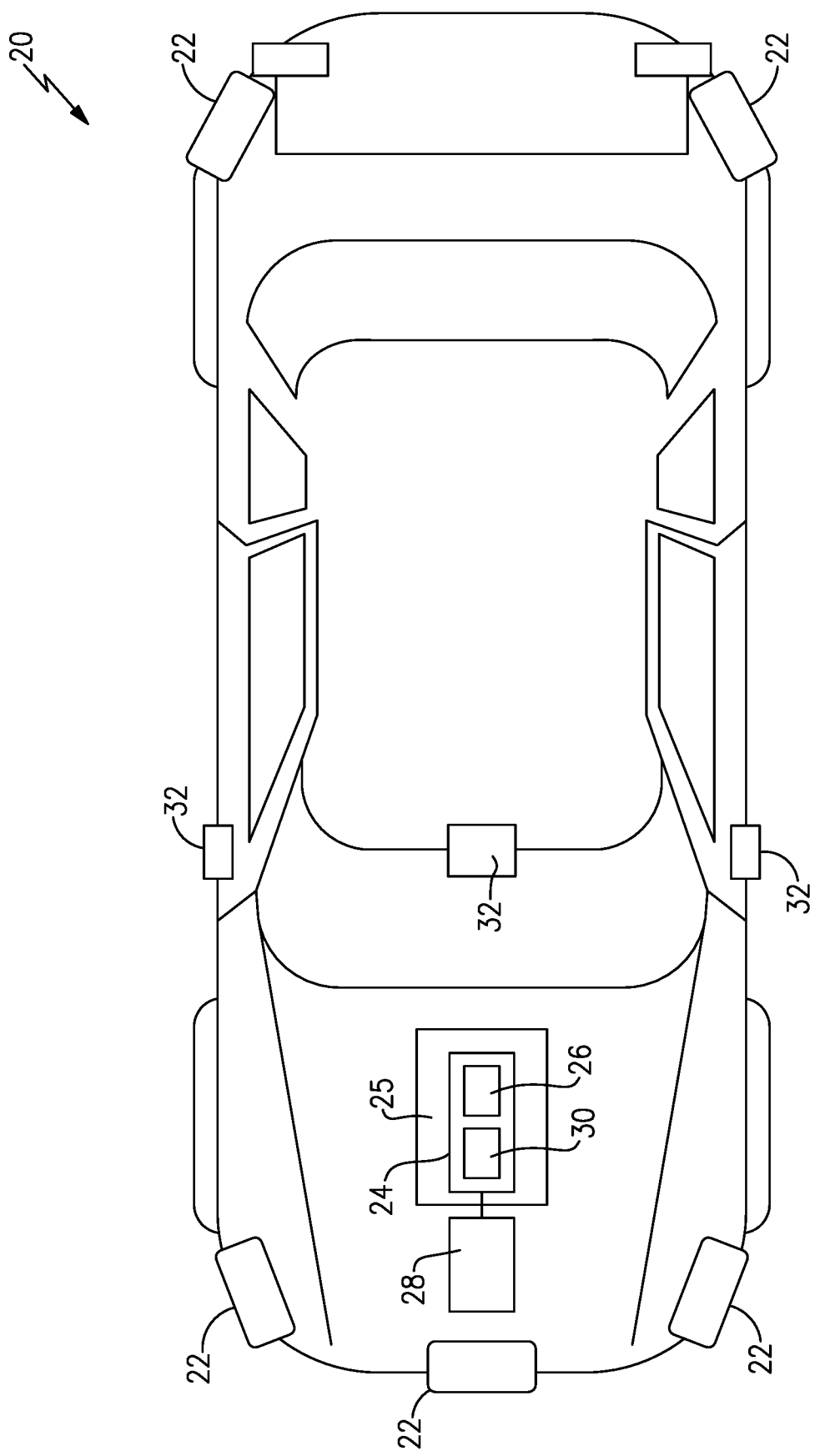
FIG. 1 is a schematic view of a vehicle including an example simultaneous localization and mapping system.

Referring to FIG. 1, a vehicle 20 is schematically shown and includes radar devices 22 disposed at various locations to obtain a 360 degree sensor field of view. The vehicle may also include cameras 32 to provide additional sensor field of view. The vehicle includes a simultaneous localization and mapping system (SLAM) 25 for generating mapping information that may be utilized by autonomous and assisted driving systems. The example SLAM system 25 embodiment utilizes data points obtained from sensor systems disposed on the vehicle, such as the radar devices 22 and cameras 32, to define at least one geometric anchor that may then be utilized to determine a relative position of the vehicle 20 and to correlate subsequently obtained data points.

The SLAM 25 is an algorithm executed by a controller 24 of the vehicle 20. The controller 24 is schematically shown and includes at least a processing device 26 and a memory device 30. The controller 24 and the processing device 26 may be a hardware device for executing software, particularly software stored in the memory 30. The processing device 26 can be a custom made or commercially available processor, a central processing unit (CPU), an auxiliary processor among several processors associated with the computing device, a semiconductor based microprocessor (in the form of a microchip or chip set) or generally any device for executing software instructions.

The memory 30 can include any one or combination of volatile memory elements (e.g., random access memory (RAM, such as DRAM, SRAM, SDRAM, VRAM, etc.)) and/or nonvolatile memory elements. Moreover, the memory 30 may incorporate electronic, magnetic, optical, and/or other types of storage media. Note that the memory can also have a distributed architecture, where various components are situated remotely from one another, but can be accessed by the processor.

The software in the memory 30 may include one or more separate programs, each of which includes an ordered listing of executable instructions for implementing disclosed logical functions and operation. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

Input/Output devices (not shown) that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the SLAM system 25 is in operation, the processor 26 can be configured to execute software stored within the memory 30, to communicate data to and from the memory 30, and to generally control operations of the system 25 pursuant to the software. Software in memory, in whole or in part, is read by the processor, perhaps buffered within the processor, and then executed. The controller 24 may control vehicle systems schematically indicated at 28 to either autonomously control the vehicle 20 or provide driver assist functions to aid an operator of the vehicle 20.

Figure 2:
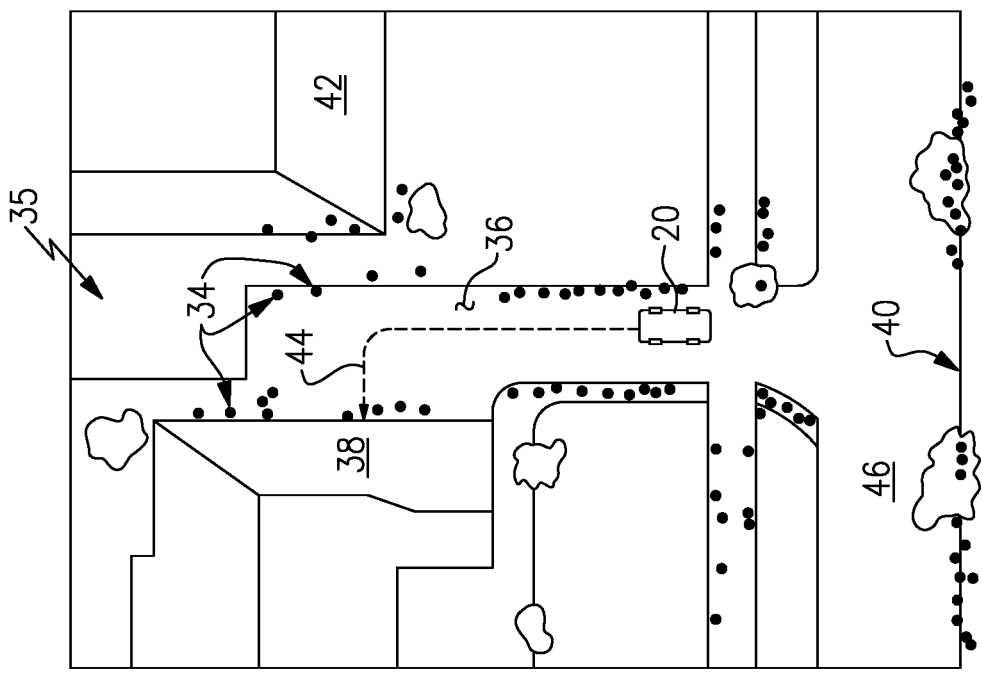
FIG. 2 is a schematic view of an example occupancy grid generated from accumulated sensor data points.

Referring to FIG. 2, with continued reference to FIG. 1, the radar devices 22 and the cameras 32 generate a plurality of sensor return data points 34 that represent points of objects within the environment surrounding the vehicle. The data points 34 are utilized to generate an occupancy grid 35 that provides information to the vehicle regarding objects proximate to the vehicle 20 and a relative location to those objects. The data points 34 may be fused and filtered before being added to the occupancy grid 35.

In this disclosed example, data points are generated for portions of a first home 38, edges of a drive way 36, a second home 42 and a curb 40 across a roadway 46 from the first home 38. The background images of the homes and other features are provided for context of real world objects to the proximate location of the data points 34. The data points 34 are shown in FIG. 2 as dots proximate features and objects surrounding the vehicle 20. The combined data points 34 provide an initial picture of the features surrounding the vehicle. In this example, the data points 34 represent an initial set of data points that provide for the generation of the initial occupancy grid 35.

The vehicle 20 may utilize the occupancy grid 35 to define a path 44 to a desired destination. In this example, the desired destination is a parking spot within a garage of the first home 38. The SLAM system 25 takes multiple passes of the environment such that additional data points are continually added to the occupancy grid 35 to improve the information and understanding of the environment around the vehicle 20.

Figure 3:
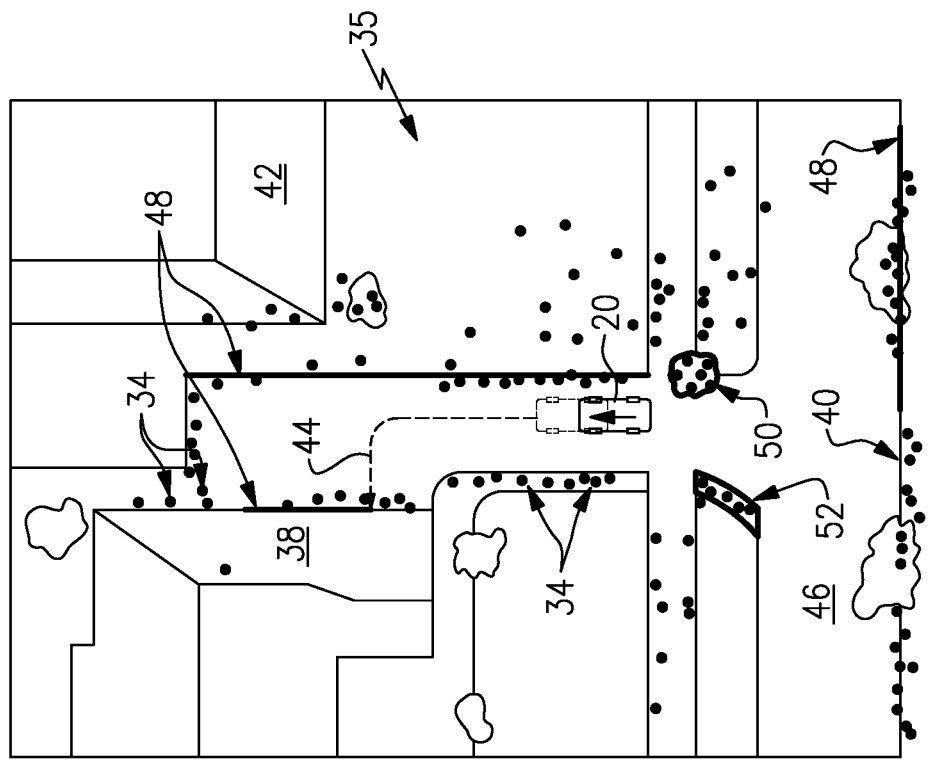
FIG. 3 is a schematic view of the example occupancy grid with geometric anchor features defined from the accumulated sensor data points.

Referring to FIG. 3, the accumulation of data points 34 and population of the occupancy grid 35 improve confidence in the occupancy grid 35 over several cycles of data point gathering. Previous data points 34 are compared to and added to subsequent data points and geometric features such as lines, curvilinear shapes and rectilinear shapes are recognized. The example SLAM system 25 utilizes the data points 32 and recognized geometric shapes to improve the occupancy grid 35. The recognized geometric shapes such as the example lines 48, circle 56 and rectangle 52 are added back to the occupancy grid as defined geometric anchors. The geometric anchors 48, 50 and 52 are clusters of data points defined by a plurality of data points 34. The constructed geometric anchors 48, 50 and 52 are maintained and utilized to verify subsequent data points rather than verifying each subsequent data point with a proceeding data point. The example system and method therefore, constructs the geometric localization features from the accumulated data points and creates geometric anchors that are referenced for localization purposes instead of using radar point based data directly. Optionally, the existing radar point based data may also be used in addition to the created geometric anchors.

As is shown in FIG. 3, data points 34 are added to the occupancy grid 35 and accumulated until sufficient data points 34 are present to define the geometric anchors. In this example, lines 48 are defined along the driveway 36, on the side of the second home 42 and across the street along a portion of the curb 40. Accordingly, rather than a plurality of clustered data points 34, the occupancy grid 35 now includes common anchor features that provide a high confidence level for localization of the vehicle. As appreciated, only a few geometric anchor features are shown in FIG. 3 by way of example, but any number of anchor features may be utilized and generated for any occupancy grid 35 within the contemplation of this disclosure.

Figure 4:
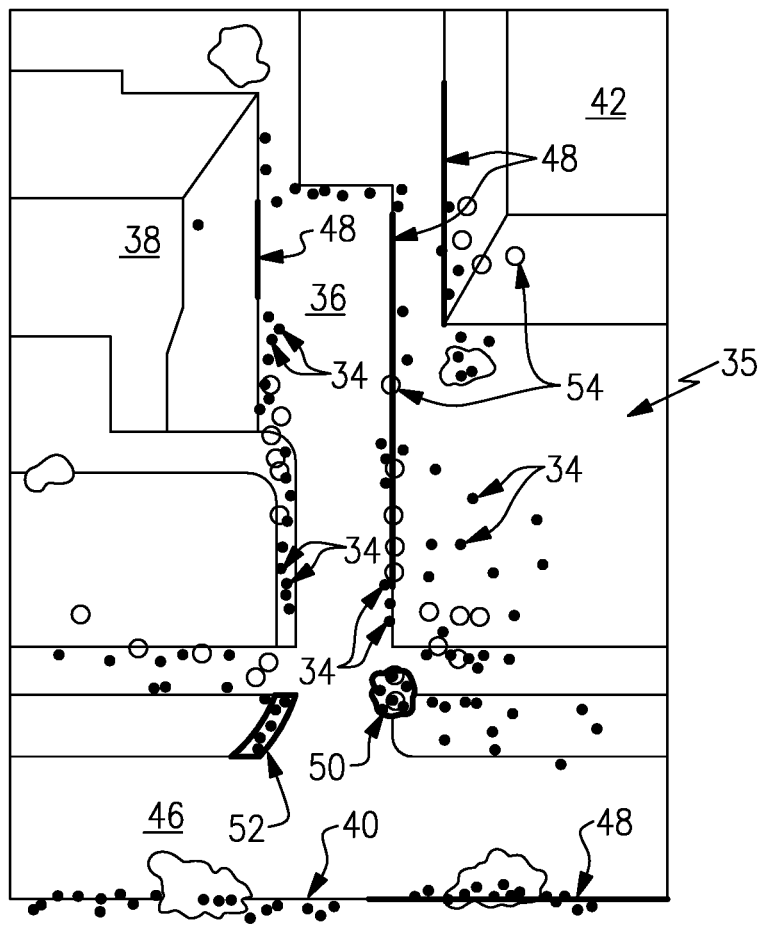
FIG. 4 is a schematic view of the example occupancy grid with additional sensor data points correlated to the geometric anchor features.

Referring to FIG. 4 with continued reference to FIG. 3, the generated anchor features 48, 50 and 52 are utilized to correlate new sensor data points 54. The anchor features 48, 50 and 52 are utilized rather than correlating each new data point 54 with a previous data point 34 and thereby significantly reduces the number of calculations required, that in turn reduces the data processing requirements of the overall system.

Once the vehicle 20 changes its position and the new sensor data 54 accumulated over multiple measurement cycles is correlated with the existing data in the occupancy grid 35. The occupancy grid 35 as is shown in FIG. 4 includes older data points and the geometric anchors 48, 50 and 52. In one disclosed example, the geometric anchors 48, 50, and 52 alone are used to correlate future sensor data to reduce the complexity of the solution while also improving computing efficiency and reducing required processing compacity.

The correlation between the geometric anchors 48, 50 and 52 is used to estimate the vehicle position and correct any error in the odometry model of the vehicle 20.

The occupancy grid 35 can then be built around the corrected position of the vehicle 20 with the latest data points 54. In one disclosed example, the geometric anchors 48,50 and 52 are recomputed after a predefined number of sensor data gathering cycles. In another disclosed embodiment, the geometric anchors 48, 50 and 52 can be recomputed after a predefined distance travelled by the vehicle 20.

Accordingly, the example SLAM system 25 utilizes at least one geometric anchor 48, 50 and 52 to correlate subsequently gathered data points for localizing a vehicle. The use of the geometric anchor features for correlating subsequently gathered data points reduces overall computing requirements to improve system efficiency.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A simultaneous localization and mapping system for a motor vehicle comprising:
a plurality of sensors disposed within a vehicle operable to detect objects proximate the vehicle and generate a plurality of data points representing sensor returns corresponding to the detected objects surrounding the vehicle; and
a controller configured to receive the data points representing the sensor returns of the detected objects surrounding the vehicle, to define an occupancy grid based on the data points, to define in the occupancy grid at least one geometric anchor from the detected data points, the at least one geometric anchor comprising at least one cluster of some of the data points and having a two dimensional (2D) or three dimensional (3D) shape, and to localize the vehicle based on the occupancy grid and the at least one geometric anchor therein using a simultaneous localization and mapping algorithm,
wherein the plurality of data points representing sensor returns comprises an initial set of data points and additional sets of data points and the controller is further configured to correlate each of the additional sets of data points to the at least one geometric anchor and to estimate a position of the vehicle based on the correlation between additional sets of data points and the at least one geometric anchor.

2. The simultaneous localization and mapping system as recited in claim 1, wherein the controller is further configured for correcting an odometry model of the vehicle based on the estimated position of the vehicle provided by the correlation between the additional sets of data points and the at least one geometric anchor.

3. The simultaneous localization and mapping system as recited in claim 1, wherein the controller is further configured to redefine the at least one geometric anchor in response to at least one of a redefined distance of vehicle travel or a predefined number of additional sets of data points.

4. The simultaneous localization and mapping system as recited in claim 1, wherein the at least one geometric anchor comprises two or more geometric anchors that define boundaries of a path of the vehicle.

5. The simultaneous localization and mapping system as recited in claim 1, wherein the at least one geometric anchor comprises the at least one cluster of some of the data points on the generated occupancy grid arranged in a straight line.

6. The simultaneous localization and mapping system as recited in claim 1, wherein the at least one geometric anchor comprises the at least one cluster of some of data the points on the generated occupancy grid arranged in a rectilinear shape or a curvilinear shape.

7. The simultaneous localization and mapping system as recited in claim 1, wherein the plurality of sensors comprises at least one of a radar device, a lidar device and a camera.

8. A simultaneous localization and mapping method for a vehicle, comprising:
   detecting objects proximate to a vehicle with a plurality of sensors and generating a plurality of data points representing sensor returns corresponding to the detected objects surrounding the vehicle;
   generating an occupancy grid based on the data points representing sensor returns with a processing device disposed within the vehicle, defining at least one geometric anchor in the occupancy grid from the detected data points, the at least one geometric anchor comprising at least one cluster of some of the data points and having a two dimensional (2D) or three dimensional (3D) shape, to localize the vehicle relative to the occupancy grid and the at least one geometric anchor therein,
   wherein generating a plurality of data points representing data points comprises generating an initial set of data points and additional sets of data points and generating the occupancy grid further comprises correlating each of the additional sets of data points with the at least one geometric anchor,
   wherein the method further comprises estimating a position of the vehicle based on the correlation between additional sets of data points and the at least one geometric anchor.

9. The method as recited in claim 8, further comprising correcting an odometry model of the vehicle based on the estimated position of the vehicle provided by the correlation between the additional sets of data points and the at least one geometric anchor.

10. The method as recited in claim 8, further comprising redefining the at least one geometric anchor in response to a redefined distance of vehicle travel.

11. The method as recited in claim 8, further comprising redefining the at least one geometric anchor in response to obtaining a predefined number of additional sets of data points.

12. The method as recited in claim 8, wherein the at least one geometric anchor comprises two or more geometric anchors that define boundaries of a path of the vehicle.

13. The method as recited in claim 8, wherein the at least one geometric anchor comprises the at least one cluster of some set of data points on the generated occupancy grid arranged in a straight line.

14. The method as recited in claim 8, wherein the at least one geometric anchor comprises the at least one cluster of some set of data points on the generated occupancy grid arranged in a rectilinear shape.

15. The method as recited in claim 8, wherein the at least one geometric anchor comprises the at least one cluster of some set of data points arranged in a curvilinear shape.

* * * * *